(12) United States Patent
Tokura (10) Patent No.: US 6,879,410 B1
(45) Date of Patent: Apr. 12, 2005

(54) DATA PROCESSING WITH POWER SAVING FUNCTION

(75) Inventor: Yutaka Tokura, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/241,872

(22) Filed: Feb. 2, 1999

(30) Foreign Application Priority Data

Feb. 4, 1998 (JP) .......................................... 10-023001

(51) Int. Cl.⁷ ............................................. G06F 15/00
(52) U.S. Cl. ...................... 358/1.14; 358/1.13; 399/18; 399/69; 399/70
(58) Field of Search ............................. 358/1.13, 1.14, 358/1.15; 399/18, 69, 70; 347/5, 3

(56) References Cited

U.S. PATENT DOCUMENTS 5,636,332 A * 6/1997 Hibino ....................... 345/690
5,819,013 A * 10/1998 Miyazaki et al. .............. 347/3
5,844,813 A * 12/1998 Tateyama ....................... 347/5
5,937,151 A * 8/1999 Kadota ....................... 358/1.15

* cited by examiner

Primary Examiner—Twyler M. Lamb
(74) Attorney, Agent, or Firm—Fitzpatrick, Cella, Harper & Scinto (57) ABSTRACT

A data processing apparatus is constructed by a selector which can select a frequency of a bi-directional communication with a printing apparatus and a communication controller for discriminating a selecting state by the selector and shifting a state of the bi-directional communication with the printing apparatus to an operative mode or a rest mode. The bi-directional communication with the printing apparatus can be performed through a predetermined communication medium and a power saving function process can be executed.

18 Claims, 4 Drawing Sheets

DATA PROCESSING WITH POWER SAVING FUNCTION

BACKGROUND OF THE INVENTION

1. Field of the Invention

The invention relates to a data processing apparatus which can execute a power saving function process when a bi-directional communication is performed to a printing apparatus through a predetermined communication medium. The invention also relates to a data processing method for such a data processing apparatus and to a memory medium in which a computer readable program to realize such a data processing method has been stored.

2. Related Background Art

Hitherto, a state of a printing apparatus is detected between an external apparatus such as a host computer or the like and the printing apparatus for a period of time except for a period during a printing process. That is, by always performing a bi-directional communication, the external apparatus such as a host computer or the like detects various states such as absence of papers, door-open, low toner amount, and the like and notifies the operator of them by a screen of the host or the like. As such a system, a WPS (Windows Printing System) has already existed. Specifically speaking, a state change information of the printer side is held in a part of a print buffer on the printer side and a printer monitor on the host side inquires it at predetermined intervals. In this case, for example, a centronics interface is used.

The above conventional system, however, has a problem such that in the external apparatus such as a host computer or the like having a power saving function, such a function does not normally operate.

The power saving function of the external apparatus such as a host computer or the like operates when the user validly sets such a function and a device access to a keyboard, a serial port, a parallel port, a hard disk, or the like does not occur.

When the bi-directional communication is always executed to the printing apparatus, however, since the apparatus accesses to the parallel port, even if the user validly sets the power saving function, the function does not normally operate. That is, there is a problem such that the process of system software to control the printing apparatus invalidates the power saving function of the external apparatus such as a host computer or the like and obstructs the operation.

SUMMARY OF THE INVENTION

The invention is made to solve the above problems and it is an object of the invention to provide a data processing apparatus in which a situation such that a power saving function is always invalidated in association with a bi-directional communication with a printing apparatus is avoided and while the power saving function is validated, the bi-directional communicating process can be realized without losing the power saving function such that a state where the bi-directional communication with a necessary printing apparatus is possible can be intermittently established at a designated time interval. Another object of the invention is to provide a data processing method for such a data processing apparatus and to provide a memory medium in which a computer readable program to realize such a data processing method has been stored.

According to a first aspect of the invention, there is provided a data processing apparatus which can execute a power saving function process when a bi-directional communication is executed to a printing apparatus through a predetermined communication medium, comprising: first selecting means for selecting whether the bi-directional communication with the printing apparatus is always executed or not; second selecting means for selecting whether the bi-directional communication with the printing apparatus is executed by a time designation or not; and communication control means for discriminating selecting states by the first and second selecting means and allowing a bi-directional communicating state with the printing apparatus to be shifted to an operative mode or a rest mode.

According to a second aspect of the invention, in the case where the presence of a print request to the printing apparatus is confirmed in a state where a mode in which the bi-directional communication with the printing apparatus is not always performed is selected by the first selecting means, the communication control means shifts the bi-directional communication with the printing apparatus during the rest to the operative mode and, after completion of a printing based on the print request, the communication control means shifts the bi-directional communication with the printing apparatus to the rest mode.

According to a third aspect of the invention, the data processing apparatus further has timer means for counting a time which is designated, in the case where it is confirmed that the timer means has finished the counting of the designated time in a state where a mode in which the bi-directional communication with the printing apparatus is performed by the time designation is selected by the second selecting means, the communication control means shifts the bi-directional communication with the printing apparatus to the operative mode and, after the state of the printing apparatus was detected, the communication control means shifts the bi-directional communication with the printing apparatus to the rest mode.

According to a fourth aspect of the invention, the data processing apparatus further has detecting means for detecting an occurrence state of an error of the printing apparatus after the bi-directional communication with the printing apparatus was shifted to the operative mode, after the error of the printing apparatus detected by the detecting means was recovered, the bi-directional communication with the printing apparatus is shifted to the operative mode, and after the state of the printing apparatus was detected, the bi-directional communication with the printing apparatus is shifted to the rest mode.

According to a fifth aspect of the invention, the data processing apparatus further has discriminating means for discriminating the presence or absence of a print request to the printing apparatus after the bi-directional communication with the printing apparatus was shifted to the rest mode, and in the case where the discriminating means determines the presence of the print request, the communication control means shifts the bi-directional communication with the printing apparatus to the operative mode, and after completion of the printing of the printing apparatus, the bi-directional communication with the printing apparatus is shifted to the rest mode.

According to a sixth aspect of the invention, the timer means starts a re-counting operation after the bi-directional communication with the printing apparatus was rested.

According to a seventh aspect of the invention, the data processing apparatus further has timer means for counting a time which is designated, when the printing process is finished in a state where a mode in which the bi-directional communication with the printing apparatus is performed by the time designation is selected by the second selecting means, after the counting operation by the timer means was started, the communication control means shifts the bi-directional communication with the printing apparatus to the operative mode, and after completion of the counting operation of the timer means was detected, the communication control means shifts the bi-directional communication with the printing apparatus to the rest mode.

According to an eighth aspect of the invention, the data processing apparatus further has discriminating means for discriminating the presence or absence of a print request to the printing apparatus after the bi-directional communication with the printing apparatus was shifted to the rest mode, and in the case where the discriminating means determines the presence of the print request, the communication control means shifts the bi-directional communication with the printing apparatus to the operative mode, and after completion of the printing of the printing apparatus, the communication control means restarts the counting operation by the timer means and shifts the bi-directional communication with the printing apparatus to the rest mode until the counting operation is finished.

According to a ninth aspect of the invention, the data processing apparatus further has detecting means for detecting an occurrence state of an error of the printing apparatus after the bi-directional communication with the printing apparatus was shifted to the operative mode, and the communication control means allows the counting operation by the timer means to be rested until the error of the printing apparatus detected by the detecting means is recovered and restarts the counting operation by the timer means after the error of the printing apparatus was recovered.

According to a tenth aspect of the invention, there is provided a data processing method of a data processing apparatus which can execute a power saving function process when a bi-directional communication is executed to a printing apparatus through a predetermined communication medium, comprising: a discriminating step of discriminating whether either a mode to always perform the bi-directional communication with the printing apparatus or a mode to execute the bi-directional communication with the printing apparatus by a time designation has been designated or not; a timer step of activating a timer to count a set time in the case where it is determined by the discriminating step that the mode to execute the bi-directional communication by the time designation has been designated; and an environment information obtaining step of obtaining environment information of the printing apparatus by bi-directionally communicating with the printing apparatus each time the timer activated by the timer step finishes the counting operation of the set time.

According to an eleventh aspect of the invention, there is provided a memory medium in which a computer readable program to control a data processing apparatus which can execute a power saving function process when a bi-directional communication is executed to a printing apparatus through a predetermined communication medium has been stored, wherein the program comprises: a discriminating step of discriminating whether either a mode to always perform the bi-directional communication with the printing apparatus or a mode to execute the bi-directional communication with the printing apparatus by a time designation has been designated or not; a timer step of activating a timer to count a set time in the case where it is determined by the discriminating step that the mode to execute the bi-directional communication by the time designation has been designated; and an environment information obtaining step of obtaining environment information of the printing apparatus by bi-directionally communicating with the printing apparatus each time the timer activated by the timer step finishes the counting operation of the set time.

According to the invention, in a spooler locating at the post stage of a printer driver on the host side and a printer monitor locating at a further post stage, with respect to a control of a printer engine, a formation of an image from a GDI function, and further, a function to check a state of the printer, a checking interval of the status can be controlled.

DETAILED DESCRIPTION OF THE PREFERRED EMBODIMENTS

[First Embodiment]

An embodiment according to the invention will now be described in detail hereinbelow with reference to the drawings.

Figure 1:
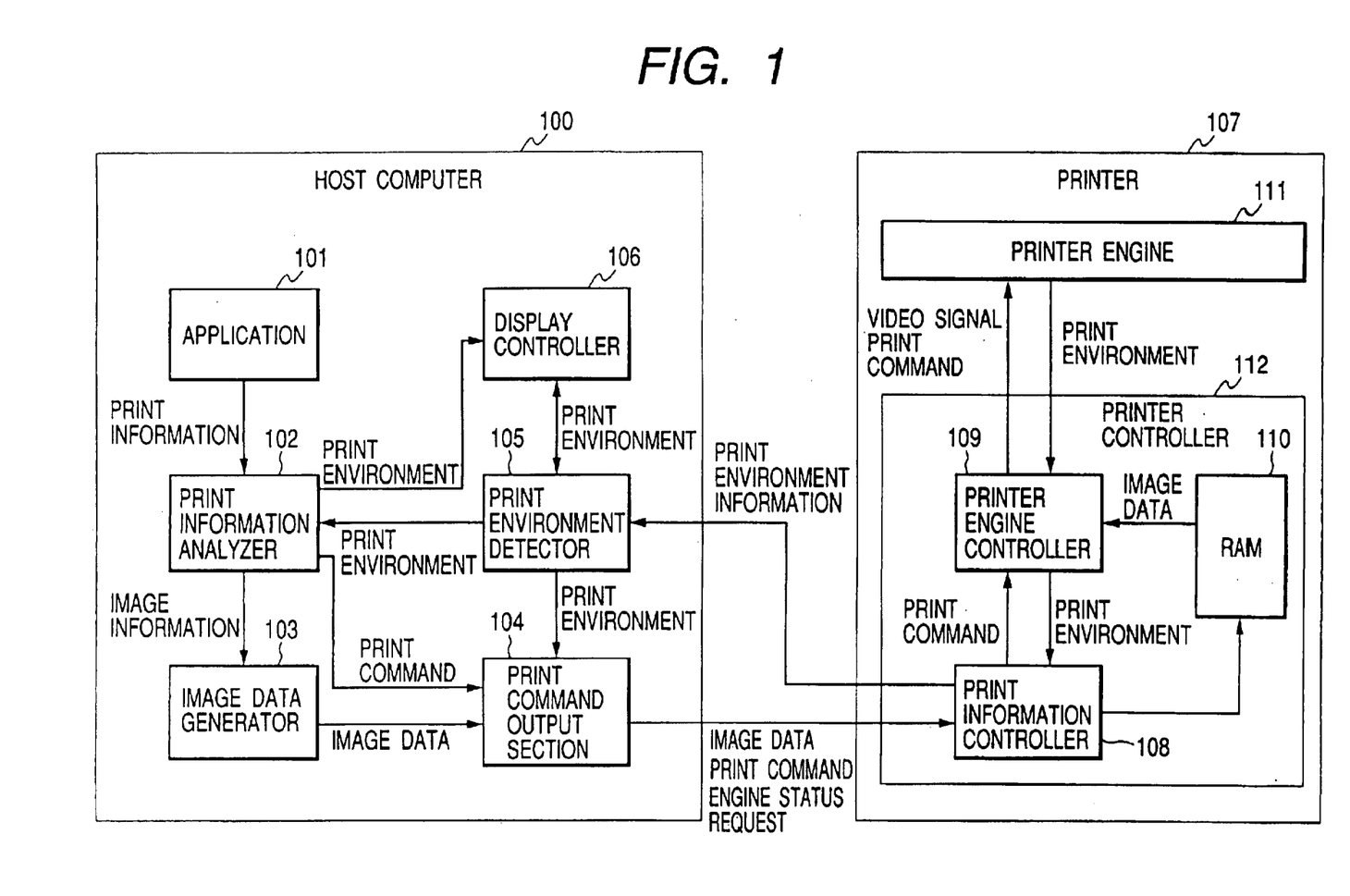
FIG. 1 is a schematic diagram showing a construction of a print system to which a data processing apparatus showing the first embodiment of the invention can be applied.

FIG. 1 is a schematic diagram showing a construction of a print system to which a data processing apparatus showing the first embodiment of the invention can be applied. The construction and operation will be described hereinbelow.

At the same time of the activation of a host computer 100, a print information analyzer 102, a print environment detector 105, and a print command output section 104 in the host computer 100 are activated.

When the user executes a printing process during the use of an application, an application 101 sends print information to the print information analyzer 102. The print information analyzer 102 forms image information from the print information and supplies it to an image data generator 103. Similarly, the print information analyzer 102 forms a print command and sends it to the print command output section 104.

In the image data generator 103, the image information is converted into image data. After a print start command was generated from the print command output section 104, the image data is sent to a printer 107. After the image information of one page was formed, the print start command which is transmitted from the host computer 100 is sent to a printer engine 111 through a print information controller 108 and a printer engine controller 109 in a printer controller 112.

The image data is transferred from the print information controller 108 to an RAM 110. When a printer engine controller 109 detects a video signal output possible notification from the printer engine 111, the image data is outputted to the printer engine 111 synchronously with a video signal of the printer engine 111.

The printer engine 111 is a printer unit to print by an electrophotographic system and executes the printing by an electrophotographic process comprising a conveying mechanism, a semiconductor laser unit, a photosensitive drum, a developing unit, a fixing unit, a drum cleaning unit, a separating unit, and the like of a recording medium which are well known although they are not shown.

A printer unit to print by an ink jet system can be also used as a printer engine 111.

An engine status request is periodically issued from the print command output section 104 and is notified to the printer engine controller 109 via the print information controller 108. The printer engine controller 109 detects the status of the printer engine 111 and notifies the print information controller 108 of the status. The print information controller 108 transfers print environment information as a printer engine status to the host computer 100. The print environment detector 105 receives the print environment information from the printer 107 and notifies a display controller 106. The display controller 106 notifies the operator of contents of the print environment information.

The display controller 106 displays a picture plane (hereinafter, referred to as a picture plane 1 (not shown)) to select whether the host computer 100 and printer 107 always perform a bi-directional communication or not and a picture plane (hereinafter, referred to as a picture plane 2 (not shown)) to select whether the bi-directional communication is executed by a time designation or not onto a display apparatus (not shown), thereby allowing the user to select and instruct a desired communicating method. On the basis of the selection instruction, the display controller 106 notifies the print environment detector 105 of the communicating method selected by the operator as one of print environments.

The print command output section 104 performs the bi-directional communicating process with the printer 107 on the basis of the above information.

A characteristic construction of the embodiment will now be described hereinbelow with reference to FIG. 1 or the like.

There is provided a data processing apparatus (host computer 100) which can execute a power saving function process when the bi-directional communication is executed to the printing apparatus (printer 107) through a predetermined communication medium constructed as mentioned above comprises: first selecting means for selecting whether the bi-directional communication with the printing apparatus is always executed or not (a selection picture plane is displayed on a display screen (not shown) and the user selects a desired bi-directional communicating state by a pointing device or the like); second selecting means for selecting whether the bi-directional communication with the printing apparatus is executed by a time designation or not (a selection picture plane is displayed on a display screen (not shown) and the user selects a desired bi-directional communicating state by a pointing device or the like); and communication control means for discriminating selecting states by the first and second selecting means and allowing the bi-directional communicating state with the printing apparatus to be shifted to an operative mode or a rest mode (although the print command output section 104 sets and controls, a CPU (not shown) can also set and control by executing a control program which is stored in an ROM or a memory resource (not shown)). Therefore, the user is allowed to freely select a print request accompanied with a desired power saving function and a print request which is not accompanied with the power saving function and an environment in which a printing process of the valid power saving function can be performed can be freely constructed.

In the case where the presence or absence of a print request to the printer 107 is confirmed in a state where the mode in which the bi-directional communication with the printer 107 is not always performed is selected by a selection on the picture plane by the user, the print command output section 104 shifts the bi-directional communication with the printer 107 during the rest to the operative mode and, after completion of the printing based on the print request, the print command output section 104 shifts the bi-directional communication with the printer 107 to the rest mode. Therefore, even when the mode in which the bi-directional communication is not always performed is selected, the bi-directional communication with the printer 107 is established in quick response to the print request which is generated and the printing process can be normally started.

The data processing apparatus further has a timer circuit (not shown) for counting a time which is designated, and in the case where it is confirmed that the timer circuit has finished the counting of the designated time in a state where the mode in which the bi-directional communication with the printer 107 is performed by the time designation is selected by a selection on the picture plane by the user, the print command output section 104 shifts the bi-directional communication with the printer 107 to the operative mode and, after the state of the printer 107 was detected, the print command output section 104 shifts the bi-directional communication with the printer 107 to the rest mode. Therefore, when the state of the bi-directional communication is shifted from the operative mode to the rest mode every elapse of the designated time, the latest state of the printing apparatus can be always monitored.

The data processing apparatus has detecting means (print environment detector 105) for detecting an occurrence state of an error of the printer 107 after the bi-directional communication with the printer 107 was shifted to the operative mode. After the error of the printing apparatus detected by the detecting means was recovered, the bi-directional communication with the printer 107 is shifted to the operative mode. After the state of the printer 107 was detected, the bi-directional communication with the printing apparatus is shifted to the rest mode. Therefore, when the state of the bi-directional communication is shifted from the operative mode to the rest mode every elapse of the designated time, if an error has occurred in the printing apparatus, until the error is recovered and the printable state is derived, error recovery information is notified to the user while maintaining the operative mode, and the state of the bi-directional communication can be shifted to the rest mode where the power saving function can be effected.

The data processing apparatus further has a print information analyzer 102 for discriminating the presence or absence of a print request to the printer 107 after the bi-directional communication with the printer 107 was shifted to the rest mode, and in the case where the print information analyzer 102 determines the presence of the print request, the print command output section 104 shifts the bi-directional communication with the printer 107 to the operative mode, and after completion of the printing of the printer 107, the print command output section 104 shifts the bi-directional communication with the printing apparatus to the rest mode. Therefore, if there is the print request while the designated time is being counted in order to shift to the rest mode, the bi-directional communicating state can be set to the operative mode until the print request is finished and the print request which can be generated at the designated time can be processed without any problem.

The timer circuit starts the re-counting operation after the bi-directional communication with the printer 107 was shifted to the rest mode. Therefore, the time point when the bi-directional communicating state is rested is used as a reference and the bi-directional communicating state can be always shifted from the rest mode to the operative mode or from the operative mode to the rest mode at predetermined intervals.

The data processing apparatus further has timer means (a timer circuit (not shown)) for counting a time which is designated. When the printing process is finished in a state where the mode in which the bi-directional communication with the printing apparatus is performed by the time designation is selected by a selecting instruction on the picture plane by the user, after the counting operation by the timer was started, the print command output section 104 shifts the bi-directional communication with the printer 107 to the operative mode. After completion of the counting operation of the timer was detected, the print command output section 104 shifts the bi-directional communication with the printer 107 to the rest mode. Therefore, until the printing process is finished on the data processing apparatus side, the bi-directional communicating state is set to the rest mode and while validly executing the power saving function, the bi-directional communicating state can be sequentially shifted from the operative mode to the rest mode every elapse of the designated time.

The data processing apparatus has discriminating means (the print information analyzer 102) for discriminating the presence or absence of a print request to the printer 107 after the bi-directional communication with the printer 107 was shifted to the rest mode. In the case where the discriminating means determines the presence of the print request, the communication control means (the print command output section 104) shifts the bi-directional communication with the printing apparatus to the operative mode. After completion of the printing of the printer 107, the counting operation by the timer circuit is restarted and the bi-directional communication with the printing apparatus is shifted to the rest mode until the counting operation is finished. Therefore, even when the bi-directional communicating state is the rest mode, if there is the print request on the data processing apparatus side, the apparatus is successively shifted to a state where the bi-directional communication is possible without waiting until the bi-directional communicating state is returned from the rest mode to the operative mode. The print request can be flexibly and promptly processed.

The data processing apparatus further has detecting means (the print environment detector 105) for detecting an occurrence state of an error of the printing apparatus after the bi-directional communication with the printer 107 was shifted to the operative mode. The print command output section 104 allows the counting operation by the timer circuit to be rested until the error of the printing apparatus detected by the print environment detector 105 is recovered, and allows the counting operation by the timer circuit to be restarted after the error of the printer 107 was recovered. Therefore, when the bi-directional communicating state is shifted from the operative mode to the rest mode every elapse of the designated time, if the error occurred in the printing apparatus, until the error is recovered and the printing is possible, the bi-directional communicating state is maintained in the operative mode without shifting to the rest mode. A fact that the printing apparatus is in the normally printable state can be certainly notified to the data processing apparatus side.

A procedure for the bi-directional communication between the host computer 100 and printer 107 in the embodiment having the foregoing construction will now be described hereinbelow with reference to a flowchart of FIG. 2.

Figure 2:
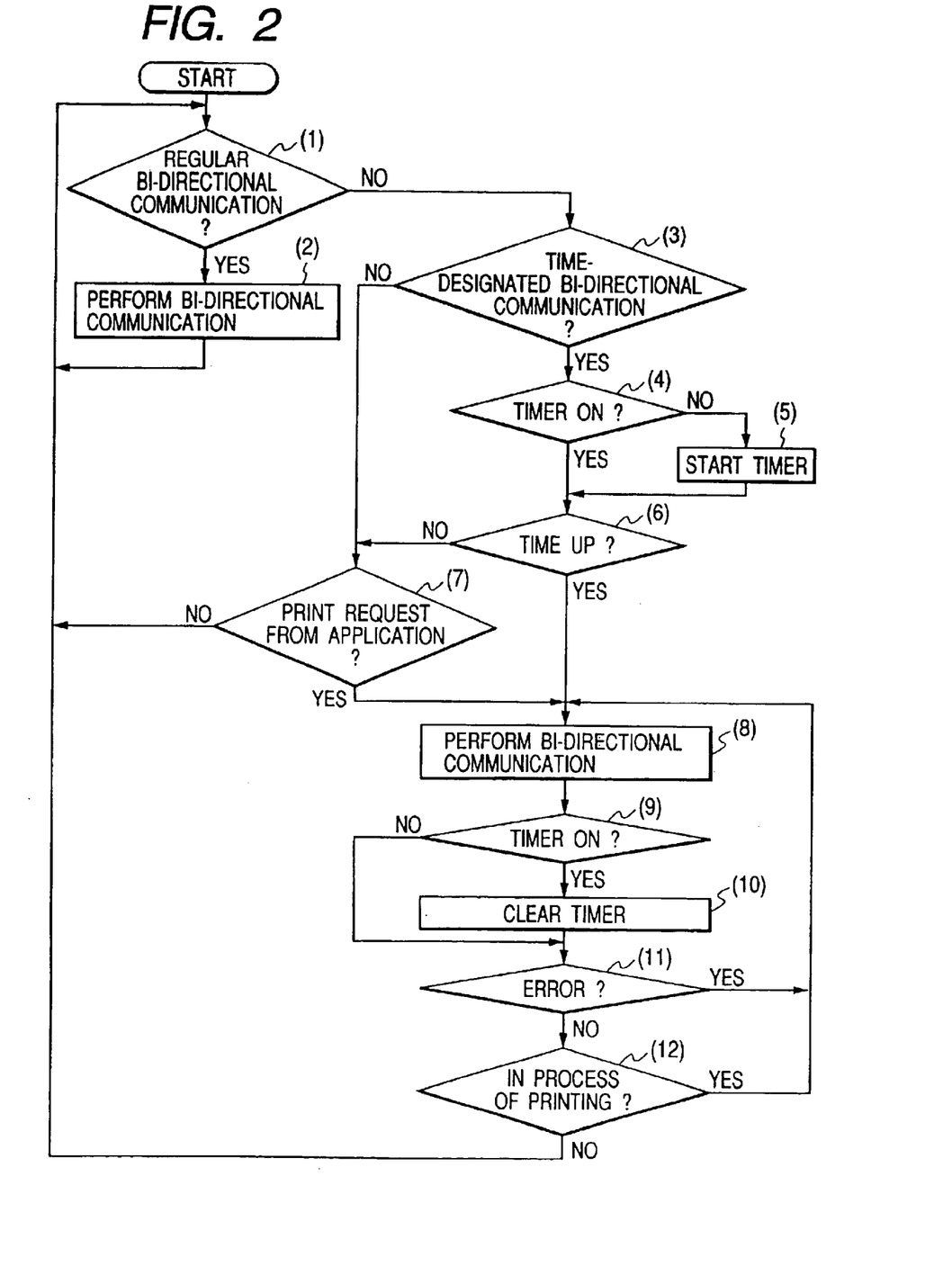
FIG. 2 is a flowchart showing an example of a first data processing procedure in the data processing apparatus according to the invention.

FIG. 2 is the flowchart showing an example of a first data processing procedure in the data processing apparatus according to the invention. Reference numerals (1) to (11) denote processing steps.

When the operator selects "the bi-directional communication is not always executed" on the picture plane 1 as mentioned above (1), the screen is changed to a picture plane 2 and the operator selects whether the time designation is performed or not (3).

When the mode to perform the bi-directional communication by the time designation is selected, the operator sets the time. A check is made to see if an internal timer has already been activated (4). If it is decided that the internal timer is not activated yet, the internal timer (not shown) is activated (5).

When it is determined in step (4) that the internal timer has already been activated, a check is made to see if the time has reached the time set by the operator (6). When it is decided that the time does not reach the time set by the operator yet or when the mode in which the time designation is not performed is selected on the picture plane 2 in step (3), a check is made to see if there is a print request from the application 101 (7). When it is decided that there is no print request, the processing routine is returned to step (1) and the state change of the picture plane 1 is monitored.

When it is decided in step (6) that the time has reached the time set by the operator or in the case where the time designation is not performed and there is the print request, the bi-directional communication is executed (8). To detect the status of the printer engine 111, a request of a printer engine status is issued from the print command output section 104 to the printer 107. The print environment detector 105 obtains the printer engine status as print environment information.

Subsequently, a check is made to see if the internal timer has been activated (9). If it is determined that the internal timer is not activated yet, step (11) follows. When it is decided that the internal timer has been activated, the internal timer is cleared (stopped and reset) (10).

The obtained printer engine status is now analyzed and a check is made to see if an error has occurred (11). When the occurrence of the error is detected, the processing routine is returned to step (8). The operation to get the printer engine status is performed until the error is recovered.

When it is determined in step (11) that no error occurs, a check is made to see if the printing process is being executed (12). When it is decided that the printing process is being performed, the processing routine is returned to step (8). When it is decided that the printing process is not being executed, the processing routine is returned to step (1) and the state of the picture plane 1 is again checked.

In step (1), namely, on the picture plane 1, when "the bi-directional communication is always performed" is selected, the printer engine status is obtained (2). The processing routine is returned to step (1) and the operation to monitor the state change of the picture plane 1 is repeated.

The printing process is started at a time point when the print request is confirmed, namely, when the processing routine is shifted from step (7) to step (8).

When the designation by the time is set upon setting of the power saving mode of the host computer 100, if the bi-directional communication (parallel port access) with the printer engine 111 by a printer driver is not performed for the designated time, the host computer 100 is shifted to the power saving mode.

The bi-directional communication is finished at a time point when the step of executing the bi-directional communication in step (8) is finished. In the case where the processing routine advances to step (8) by deciding the presence of the print request in step (7), the set items such as paper feed port, paper size, print concentration, and the like which have been set at present in the printer as a printer engine status are obtained in step (8). If the set items differ from the set contents which are instructed by the print request, the instructed set contents are transmitted to the printer 107 and are set. The printer engine status which can be obtained and the set items which can be set are different every kind of the printer engine 111.

A characteristic construction of the embodiment will now be described hereinbelow with reference to the flowchart shown in FIG. 2.

There is provided a data processing method of a data processing apparatus with the above construction which can execute a power saving function process when a bi-directional communication is executed to a printing apparatus through a predetermined communication medium or there is provided a memory medium in which a computer readable program to control a data processing apparatus which can execute a power saving function process when a bi-directional communication is executed to a printing apparatus through a predetermined communication medium has been stored, wherein the program comprises: a discriminating step (steps (1) and (3) in FIG. 2) of discriminating whether either the mode to always perform the bi-directional communication with the printing apparatus or the mode to execute the bi-directional communication with the printing apparatus by a time designation has been designated or not; a timer step (step (5) in FIG. 2) of activating a timer to count a set time in the case where it is determined by the discriminating step that the mode to execute the bi-directional communication by the time designation has been designated; and an environment information obtaining step (step (8) in FIG. 2) of obtaining environment information of the printing apparatus by bi-directionally communicating with the printing apparatus each time the timer activated by the timer step finishes the counting operation of the set time. Therefore, even if the apparatus enters the power saving mode, the state where the bi-directional communication with the printing apparatus can be performed is established at the designated time interval, thereby enabling various information including the state of the printing apparatus to be exchanged.

[Second Embodiment]

The first embodiment has been described with respect to the case where when the mode to perform the bi-directional communication by the time designation is selected, the bi-directional communication is executed each time the time set by the operator elapses after completion of the printing or when the presence of the print request is determined. However, it is also possible to construct in a manner such that when the mode to perform the bi-directional communication by the time designation is selected, the bi-directional communication is continued until the time set by the operator elapses after completion of the printing, and when the time exceeds the set time, the bi-directional communication is set into the rest mode. The construction in such a case will now be described hereinbelow.

A procedure for the bi-directional communication between the host computer 100 and printer 107 in the second embodiment having the construction shown in FIG. 1 will now be described hereinbelow with reference to a flowchart of FIG. 3.

Figure 3:
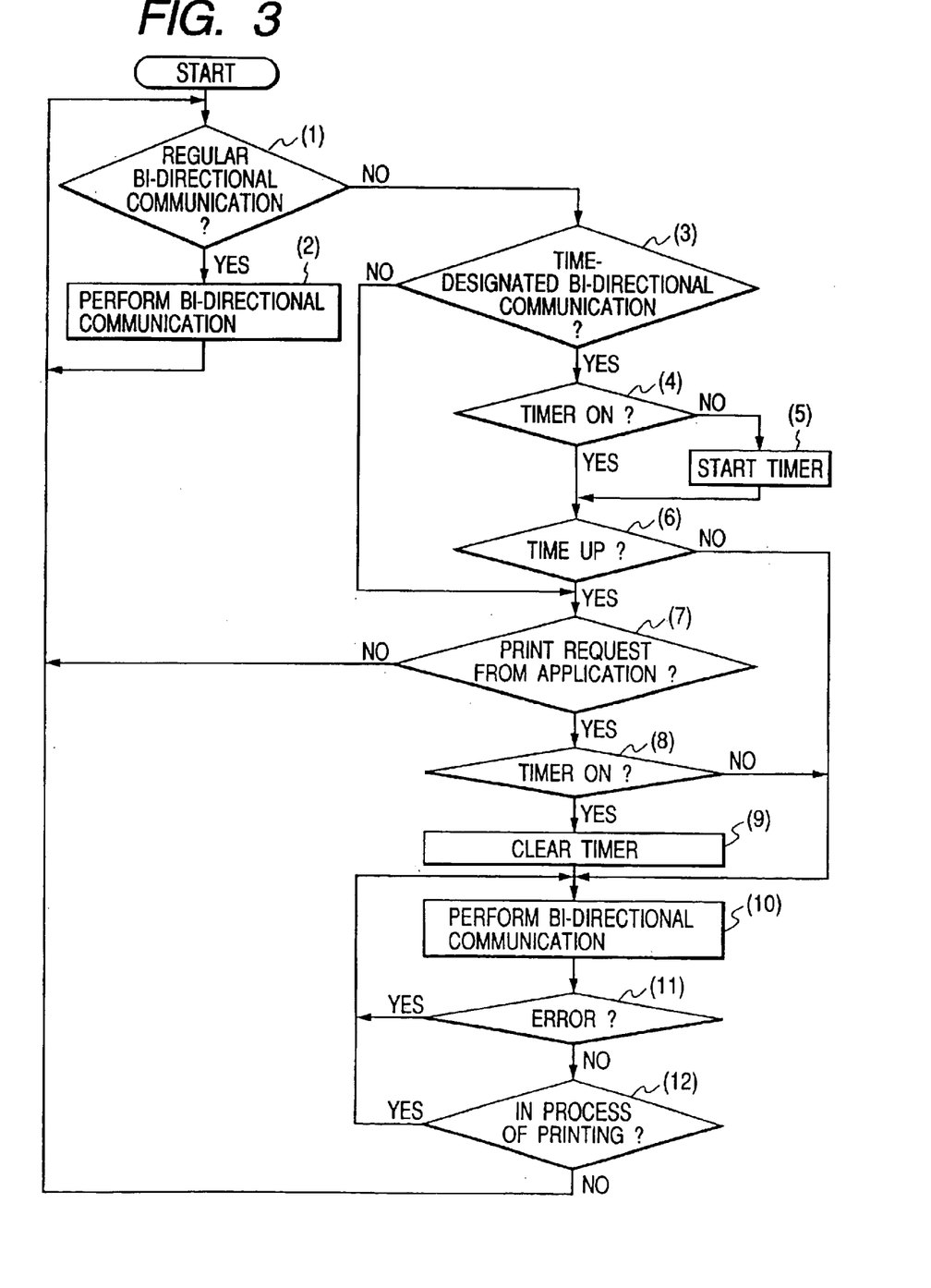
FIG. 3 is a flowchart showing an example of a second data processing procedure in the data processing apparatus according to the invention.

FIG. 3 is the flowchart showing an example of a second data processing procedure in the data processing apparatus according to the invention. Reference numerals (1) to (11) denote processing steps.

First, a check is made to see if the operator has selected "the bi-directional communication is always performed" on the picture plane 1 (1). When it is determined that "the bi-directional communication is always performed" is not selected, the screen is changed to the picture plane 2. A check is made to see if "the time designation is performed" has been selected (3). When it is determined that the mode in which the bi-directional communication by the time designation is not performed has been selected, the processing routine advances to step (7) and subsequent steps.

When it is decided in step (3) that the mode to perform the bi-directional communication by the time designation has been selected, the operator sets the time. A check is made to see if the internal timer has already been activated (4). If the internal timer has already been activated, step (6) follows. When it is decided that the internal timer is not activated, the internal timer is activated (5).

A check is subsequently made to see if the time has reached the time set by the operator (6). If it is decided that the time has reached the time set by the operator, a check is made to see if there is the print request from the application 101 (7). If the absence of the print request is detected, the processing routine is returned to step (1) and the state change of the picture plane 1 is monitored.

When the presence of the print request is decided in step (7), the printing process is started and a check is made to see if the internal timer has already been activated (8). When it is decided that the internal timer has already been activated, the internal timer is cleared (stopped and reset) (9). The bi-directional communication with the printer 107 is executed. To detect the status of the printer engine 111, a request of the printer engine status is issued from the print command output section 104 to the printer 107. Subsequently, the print environment detector 105 obtains the printer engine status as print environment information (10).

When it is decided in step (6) that the time has reached the time set by the operator as well, step (10) follows. The bi-directional communication with the printer 107 is executed and the printer engine status is similarly obtained.

The print information analyzer 102 subsequently analyzes the printer engine status obtained through the print environment detector 105, thereby discriminating the occurrence of an error (11). If the occurrence of the error is detected, the processing routine is returned to step (10). The printer engine status is obtained until the error is recovered.

When it is determined in step (11) that no error occurs, a check is made to see if the printing process is being executed (12). When it is decided that the printing process is being executed, the processing routine is returned to step (10). When it is determined that the printing process is not being executed, the processing routine is returned to step (1) and the operation to monitor the state change of the picture plane 1 is repeated.

When it is determined in step (1) that the mode to always perform the bi-directional communication has been selected on the picture plane 1, the printer engine status is obtained (2). The processing routine is returned to step (1) and the operation to monitor the state change of the picture plane 1 is repeated.

The printing process is started at a time point when the print request is confirmed, namely, when the processing routine is shifted from step (7) to step (8).

When the designation by the time is set upon setting of the power saving mode of the host computer 100, if the bi-directional communication (parallel port access) with the printer engine 111 by the printer driver is not performed for the designated time, the host computer 100 is shifted to the power saving mode.

The bi-directional communication is finished at a time point when the step of executing the bi-directional communication in step (10) is finished. In the case where the processing routine advances to step (10) by deciding the presence of the print request in step (7), the set items such as paper feed port, paper size, print concentration, and the like which have been set at present in the printer as a printer engine status are obtained in step (10). If the set items differ from the set contents which are instructed by the print request, the instructed set contents are transmitted to the printer 107 and are set. The printer engine status which can be obtained and the set items which can be set are different every kind of the printer engine 111.

A construction of a data processing program which can be read out by the print system to which the data processing apparatus according to the invention can be applied will now be described hereinbelow with reference to a memory map shown in FIG. 4.

Figure 4:
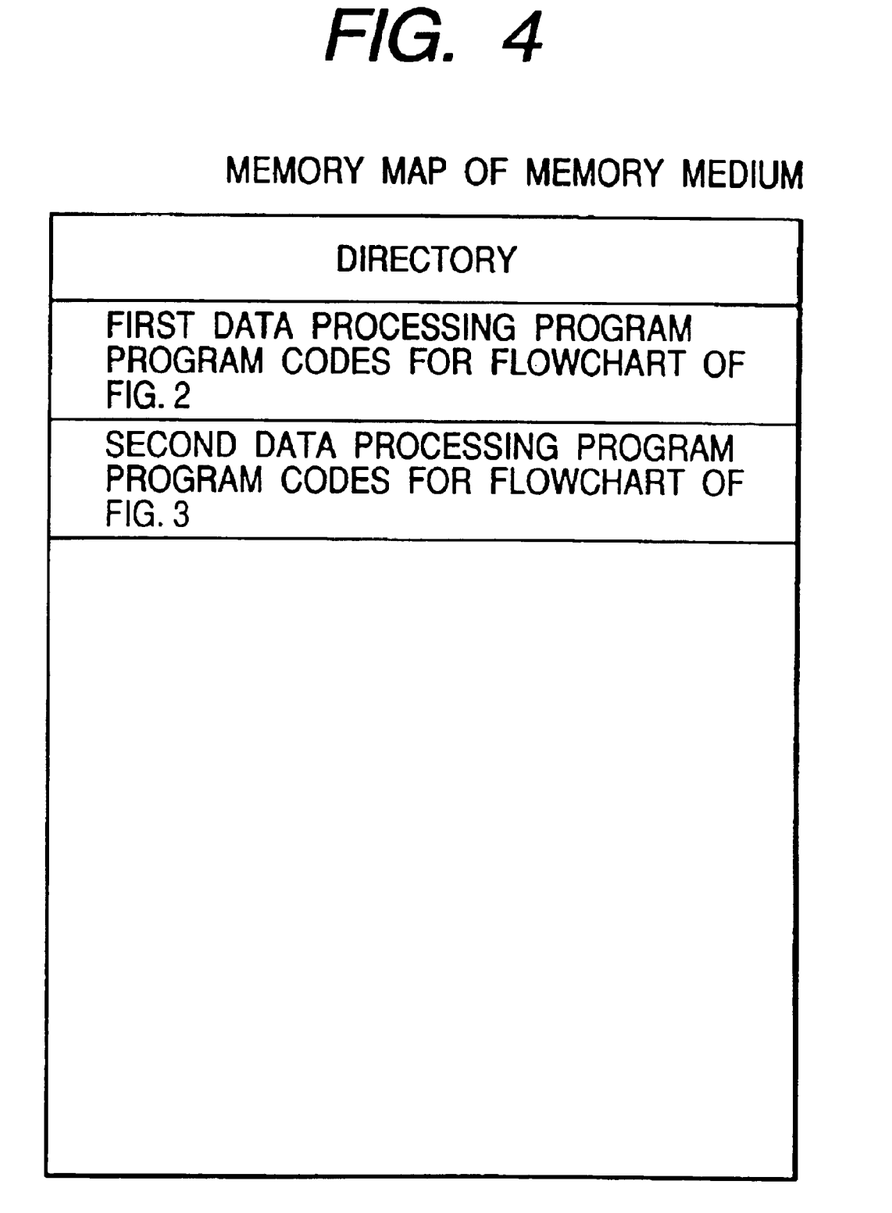
FIG. 4 is a diagram for explaining a memory map of a memory medium to store various data processing programs which can be read out by the print system to which the data processing apparatus according to the invention can be applied.

FIG. 4 is a diagram for explaining a memory map of a memory medium to store various data processing programs which can be read out by the print system to which the data processing apparatus according to the invention can be applied.

Although not particularly shown, there is also a case where information to manage the programs which are stored into the memory medium, for example, version information, a person who made the programs, and the like are also stored, and information depending on the OS or the like on the program reading side, for example, an icon or the like to identify and display the program is also stored.

Further, data depending on the various programs is also managed in a directory. There is also a case where a program to install the various programs into a computer or, if the program to install has been compressed, a program to decompress such a program, and the like are stored.

The functions shown in FIGS. 2 and 3 in the embodiments can be executed by the host computer by a program which is installed from the outside. In such a case, the invention is also applied to the case where information including the program is supplied to an output apparatus from a memory medium such as CD-ROM, flash memory, FD, or the like or from an external memory medium through a network.

It will be obviously understood that the objects of the invention are accomplished by a method whereby a memory medium in which program codes of software to realize the functions of the foregoing embodiments have been stored as mentioned above is loaded into a system or an apparatus and a computer (or CPU or MPU) of the system or apparatus reads out the program codes stored in the memory medium and executes them.

In this case, the program codes themselves read out from the memory medium realize the novel functions of the invention and the memory medium in which the program codes have been stored constructs the invention.

As a memory medium to supply the program codes, for instance, it is possible to use any one of a floppy disk, a hard disk, an optical disk, a magnetooptical disk, a CD-ROM, a CD-R, a magnetic tape, a non-volatile memory card, an ROM, an EEPROM, and the like.

It will be obviously understood that not only a case where the functions of the foregoing embodiments are realized by executing the read-out program codes by the computer but also a case where the OS (operating system) or the like which operates on the computer executes a part or all of the actual processes on the basis of instructions of the program codes and the functions of the foregoing embodiments are realized by those processes are incorporated in the invention.

Further, it will be obviously understood that a case where the program codes read out from the memory medium are written into a memory provided for a function expanding board inserted into the computer or a function expanding unit connected to the computer and, after that, a CPU or the like provided for the function expanding board or function expanding unit executes a part or all of the actual processes on the basis of instructions of the program codes, and the functions of the foregoing embodiments are realized by those processes is also incorporated in the invention.

According to the first aspect of the invention as described above, there is provided the data processing apparatus which can execute the power saving function process when the bi-directional communication is executed to the printing apparatus through a predetermined communication medium, comprising: the first selecting means for selecting whether the bi-directional communication with the printing apparatus is always executed or not; the second selecting means for selecting whether the bi-directional communication with the printing apparatus is executed by a time designation or not; and the communication control means for discriminating selecting states by the first and second selecting means and allowing the bi-directional communicating state with the printing apparatus to be shifted to the operative mode or the rest mode. Therefore, it is possible to freely construct an environment such that the user is allowed to freely select the print request accompanied with the power saving function which is desired by the user or the print request which is not accompanied with the power saving function, thereby enabling the printing process in which the power saving function is valid to be executed.

According to the second aspect of the invention, in the case where the presence of the print request to the printing apparatus is confirmed in a state where the mode in which the bi-directional communication with the printing apparatus is not always performed is selected by the first selecting means, the communication control means shifts the bi-directional communication with the printing apparatus during the rest to the operative mode and, after completion of the printing based on the print request, the communication control means shifts the bi-directional communication with the printing apparatus to the rest mode. Therefore, even if the mode in which the bi-directional communication is not always performed is selected, the bi-directional communication with the printing apparatus is established in quick response to the print request which is generated and the printing process can be normally started.

According to the third aspect of the invention, the data processing apparatus has the timer means for counting a time which is designated, in the case where it is confirmed that the timer means has finished the counting of the designated time in a state where the mode in which the bi-directional communication with the printing apparatus is performed by the time designation is selected by the second selecting means, the communication control means shifts the bi-directional communication with the printing apparatus to the operative mode and, after the state of the printing apparatus was detected, the communication control means shifts the bi-directional communication with the printing apparatus to the rest mode. Therefore, when the bi-directional communicating state is shifted from the operative mode to the rest mode every elapse of the designated time, the latest state of the printing apparatus can be always monitored.

According to the fourth aspect of the invention, the data processing apparatus has the detecting means for detecting an occurrence state of an error of the printing apparatus after the bi-directional communication with the printing apparatus was shifted to the operative mode, after the error of the printing apparatus detected by the detecting means was recovered, the bi-directional communication with the printing apparatus is shifted to the operative mode, and after the state of the printing apparatus was detected, the bi-directional communication with the printing apparatus is shifted to the rest mode. Therefore, when the bi-directional communicating state is shifted from the operative mode to the rest mode every elapse of the designated time, if an error has occurred in the printing apparatus, until the error is recovered and the apparatus enters the printable mode, the error recovery information is notified to the user while the bi-directional communicating state is maintained in the operative mode, and the bi-directional communicating state can be shifted to the rest mode in which the power saving function can be effected.

According to the fifth aspect of the invention, the data processing apparatus has the discriminating means for discriminating the presence or absence of a print request to the printing apparatus after the bi-directional communication with the printing apparatus was shifted to the rest mode, and in the case where the discriminating means determines the presence of the print request, the communication control means shifts the bi-directional communication with the printing apparatus to the operative mode, and after completion of the printing of the printing apparatus, the bi-directional communication with the printing apparatus is shifted to the rest mode. Therefore, if there is the print request during the counting of the time designated to shift to the rest mode, the bi-directional communicating state can be set to the operative mode until the print request is finished. The print request which can be generated at the designated time can be processed without any trouble.

According to the sixth aspect of the invention, the timer means starts a re-counting operation after the bi-directional communication with the printing apparatus was shifted to the rest mode. Therefore, the time point when the bi-directional communicating state is rested is used as a reference and the bi-directional communicating state can be always shifted from the rest mode to the operative mode or from the operative mode to the rest mode at predetermined intervals.

According to the seventh aspect of the invention, the data processing apparatus has the timer means for counting a time which is designated, when the printing process is finished in a state where the mode in which the bi-directional communication with the printing apparatus is performed by the time designation is selected by the second selecting means, after the counting operation by the timer means was started, the communication control means shifts the bi-directional communication with the printing apparatus to the operative mode, and after completion of the counting operation of the timer means was detected, the communication control means shifts the bi-directional communication with the printing apparatus to the rest mode. Therefore, until the printing process is finished on the data processing apparatus side, the bi-directional communicating state is set to the rest mode and while the power saving function is validly executed and every elapse of the designated time, the bi-directional communicating state can be sequentially shifted from the operative mode to the rest mode.

According to the eighth aspect of the invention, the data processing apparatus has the discriminating means for discriminating the presence or absence of a print request to the printing apparatus after the bi-directional communication with the printing apparatus was shifted to the rest mode, and in the case where the discriminating means determines the presence of the print request, the communication control means shifts the bi-directional communication with the printing apparatus to the operative mode, and after completion of the printing of the printing apparatus, the communication control means restarts the counting operation by the timer means and shifts the bi-directional communication with the printing apparatus to the rest mode until the counting operation is finished. Therefore, even when the bi-directional communicating state is the rest mode, if there is the print request on the data processing apparatus side, the mode is successively shifted to the state where the bi-directional communication is possible without waiting until the bi-directional communicating state is returned from the rest mode to the operative mode, and the print request can be flexibly and promptly processed.

According to the ninth aspect of the invention, the data processing apparatus has the detecting means for detecting an occurrence state of an error of the printing apparatus after the bi-directional communication with the printing apparatus was shifted to the operative mode, and the communication control means allows the counting operation by the timer means to be rested until the error of the printing apparatus detected by the detecting means is recovered and restarts the counting operation by the timer means after the error of the printing apparatus was recovered. Therefore, when the bi-directional communicating state is shifted from the operative mode to the rest mode every elapse of the designated time, if an error has occurred in the printing apparatus, until the error is recovered and the apparatus enters the printable mode, the bi-directional communicating state is maintained in the operative mode without setting into the rest mode. A fact that the printing apparatus enters the normal printable state can be certainly notified to the data processing apparatus side.

According to the tenth or eleventh aspect of the invention, there is provided the data processing method of a data processing apparatus which can execute a power saving function process when a bi-directional communication is executed to a printing apparatus through a predetermined communication medium or there is provided the memory medium in which a computer readable program to control a data processing apparatus which can execute a power saving function process when a bi-directional communication is executed to a printing apparatus through a predetermined communication medium has been stored, wherein the program comprises: the discriminating step of discriminating whether either the mode to always perform the bi-directional communication with the printing apparatus or the mode to execute the bi-directional communication with the printing apparatus by the time designation has been designated or not; the timer step of activating the timer to count a set time in the case where it is determined by the discriminating step that the mode to execute the bi-directional communication by the time designation has been designated; and the environment information obtaining step of obtaining environment information of the printing apparatus by bi-directionally communicating with the printing apparatus each time the timer activated by the timer step finishes the counting operation of the set time. Therefore, even if the apparatus enters the power saving mode, the state where the bi-directional communication with the printing apparatus is possible is established at the designated time interval, thereby enabling various information including the state of the printing apparatus to be exchanged.

There is, consequently, an effect such that a situation in which the power saving function is always invalidated in association with the bi-directional communication with the printing apparatus is avoided and while the power saving function is validated, the bi-directional communicating process can be realized without substantially losing the power saving function in which the state where the bi-directional communication with the necessary printing apparatus is possible can be intermittently established at the designated time interval or the like.

What is claimed is:

1. A data processing apparatus having a power saving function and providing bi-directional communication with a printing apparatus, said data processing apparatus comprising:

setting means for setting, in accordance with an instruction given via a setting screen, whether or not the bi-directional communication with the printing apparatus is always accepted when a print request for the printing apparatus cannot be confirmed; and communication control means for, in accordance with a setting by said setting means, shifting the bi-directional communication with the printing apparatus to an operative state or a rest state, wherein the bi-directional communication with the printing apparatus may be performed through a predetermined communication medium, and wherein if a print request for the printing apparatus is confirmed in a condition in which said setting means sets that the bi-directional communication with the printing apparatus is not always accepted, said communication control means shifts the bi-directional communication with the printing apparatus in the rest state to the operative state.

2. An apparatus according to claim 1, further comprising timer means for designating a time of the bi-directional communication and for counting the designated time, wherein, in an event in which the bi-directional communication with the printing apparatus is executed by a time designation, if it is confirmed that said timer means has finished counting of the designated time, said communication control means shifts the bi-directional communication with the printing apparatus to the operative state, and, after detection of a state of the printing apparatus, said communication control means shifts the bi-directional communication with the printing apparatus to the rest state.

3. An apparatus according to claim 2, further comprising detecting means for detecting an occurrence state of an error of the printing apparatus after the bi-directional communication with the printing apparatus is shifted to the operative state, wherein, after recovering from the error of the printing apparatus detected by said detecting means, the bi-directional communication with the printing apparatus is shifted to the operative state, and, after detection of the state of the printing apparatus, the bi-directional communication with the printing apparatus is shifted to the rest state.

4. An apparatus according to claim 1, further comprising second setting means for setting, in accordance with an instruction given via a setting screen, whether the bi-directional communication with the printing apparatus is executed based on a time designation, wherein said communication control means determines a setting by said second setting means and shifts the bi-directional communication with the printing apparatus to the operative state or the rest state based on the determined setting.

5. A data processing method having a power saving function and providing bi-directional communication with a printing apparatus, said data processing method comprising:

a setting step, of setting, in accordance with an instruction given via a setting screen, whether or not the bi-directional communication with the printing apparatus is always accepted when a print request for the printing apparatus cannot be confirmed; and a communication control step, of, in accordance with a setting in said setting step, shifting the bi-directional communication with the printing apparatus to an operative state or a rest state, wherein the bi-directional communication with the printing apparatus may be performed through a predetermined communication medium, and wherein if a print request for the printing apparatus is confirmed in a condition in which it has been set in said setting step that the bi-directional communication with the printing apparatus is not always accepted, said communication control step includes shifting the bi-directional communication with the printing apparatus in the rest state to the operative state.

6. A method according to claim 5, wherein, if a print request for the printing apparatus is confirmed in a condition in which it is set in said setting step that the bi-directional communication with the printing apparatus is not always accepted, then in said communication control step, the bi-directional communication with the printing apparatus in the rest state is shifted to the operative state.

7. A method according to claim 5, further comprising a timer step, of designating a time of the bi-directional communication and counting the designated time, wherein, in an event in which the bi-directional communication with the printing apparatus is executed by a time designation, if it is confirmed that the counting of the designated time in said timer step has finished, then in said communication control step, the bi-directional communication with the printing apparatus is shifted to the operative state, and, after detection of a state of the printing apparatus, the bi-directional communication with the printing apparatus is shifted to the rest state.

8. A method according to claim 7, further comprising a detecting step, of detecting an occurrence state of an error of the printing apparatus after the bi-directional communication with the printing apparatus is shifted to the operative state, wherein, after recovering from the error of the printing apparatus detected in said detecting step, the bi-directional communication with the printing apparatus is shifted to the operative state, and, after detection of the state of the printing apparatus, the bi-directional communication with the printing apparatus is shifted to the rest state.

9. A method according to claim 5, further comprising a second setting step, of setting, in accordance with an instruction given via a setting screen, whether the bi-directional communication with the printing apparatus is executed based on a time designation, wherein said communication control step includes determining a setting in said second setting step and shifting the bi-directional communication with the printing apparatus to the operative state or the rest state based on the determined setting.

10. A computer-readable memory medium in which is stored a program for implementing a method of controlling a data processing apparatus, which performs a power saving function process when a bi-directional communication with a printing apparatus is executed through a predetermined communication medium, wherein the method comprises:

a setting step, of setting, in accordance with an instruction given via a setting screen, whether or not the bi-directional communication with the printing apparatus is always accepted when a print request for the printing apparatus cannot be confirmed; and a communication control step, of, in accordance with a setting in said setting step, shifting the bi-directional communication with the printing apparatus to an operative state or a rest state, wherein the bi-directional communication with the printing apparatus may be performed through the predetermined communication medium, and wherein if a print request for the printing apparatus is confirmed in a condition in which it has been set in said setting step that the bi-directional communication with the printing apparatus is not always accepted, said communication control step includes shifting the bi-directional communication with the printing apparatus in the rest state to the operative state.

11. A medium according to claim 10, wherein, if a print request for the printing apparatus is confirmed in a condition in which it is set in said setting step that the bi-directional communication with the printing apparatus is not always accepted, then in said communication control step, the bi-directional communication with the printing apparatus in the rest state is shifted to the operative state.

12. A medium according to claim 10, wherein the method further comprises a timer step, of designating a time of the bi-directional communication and counting the designated time, and wherein, in an event in which the bi-directional communication with the printing apparatus is executed by a time designation, if it is confirmed that the counting of the designated time in said timer step has finished, then in said communication control step, the bi-directional communication with the printing apparatus is shifted to the operative state, and, after detection of a state of the printing apparatus, the bi-directional communication with the printing apparatus is shifted to the rest state.

13. A medium according to claim 12, wherein the method further comprises a detecting step, of detecting that an error has occurred in the printing apparatus after the bi-directional communication with the printing apparatus is shifted to the operative state, and wherein, after recovering from the error of the printing apparatus detected in said detecting step, the bi-directional communication with the printing apparatus is shifted to the operative state, and, after detection of the state of the printing apparatus, the bi-directional communication with the printing apparatus is shifted to the rest state.

14. A medium according to claim 10, wherein the method further comprises a second setting step, of setting, in accordance with an instruction given via a setting screen, whether the bi-directional communication with the printing apparatus is executed based on a time designation, wherein said communication control step includes determining a setting in said second setting step and shifting the bi-directional communication with the printing apparatus to the operative state or the rest state based on the determined setting.

15. A data processing apparatus having a power saving function and providing a bi-directional communication with a printing apparatus, said data processing apparatus comprising:

setting means for setting whether or not the bi-directional communication with the printing apparatus is always accepted when a print request for the printing apparatus cannot be confirmed; and communication control means for, in accordance with a setting by said setting means, shifting the bi-directional communication with the printing apparatus to an operative state or a rest state, wherein the bi-directional communication with the printing apparatus may be performed through a predetermined communication medium, and wherein if a print request for the printing apparatus is confirmed in a condition in which said setting means sets that the bi-directional communication with the printing apparatus is not always accepted, said communication control means shifts the bi-directional communication with the printing apparatus in the rest state to the operative state.

16. A data processing method having a power saving function and providing a bi-directional communication with a printing apparatus, said data processing method comprising:

a setting step, of setting whether or not the bi-directional communication with the printing apparatus is always accepted when a print request for the printing apparatus cannot be confirmed; and a communication control step, of shifting, in accordance with a setting in said setting step, shifting the bi-directional communication with the printing apparatus to an operative state or a rest state, wherein the bi-directional communication with the printing apparatus may be performed through a predetermined communication medium, and wherein if a print request for the printing apparatus is confirmed in a condition in which it has been set in said setting step that the bi-directional communication with the printing apparatus is not always accepted, then said communication control step includes shifting the bi-directional communication with the printing apparatus in the rest state to the operative state.

17. A computer-readable memory medium in which is stored a program for implementing a data processing method having a power saving function and providing a bi-directional communication with a printing apparatus, wherein the data processing method comprises:

a setting step, of setting whether or not the bi-directional communication with the printing apparatus is always accepted when a print request for the printing apparatus cannot be confirmed; and a communication control step, of shifting, in accordance with a setting in said setting step, the bi-directional communication with the printing apparatus to an operative state or a rest state, wherein the bi-directional communication with the printing apparatus may be performed through a predetermined communication medium, and wherein if a print request for the printing apparatus is confirmed in a condition in which it has been set in said setting step that the bi-directional communication with the printing apparatus is not always accepted, then said communication control step includes shifting the bi-directional communication with the printing apparatus in the rest state to the operative state.

18. A computer program executed by a computer processor of a data processing apparatus for implementing a data processing method having a power saving function and providing a bi-directional communication with a printing apparatus, said computer program comprising:

program code for setting whether or not the bi-directional communication with the printing apparatus is always accepted when a print request for the printing apparatus cannot be confirmed; and program code for shifting, in accordance with a setting by said program code for setting, the bi-directional communication with the printing apparatus to an operative state or a rest state, wherein the bi-directional communication with the printing apparatus may be performed through a predetermined communication medium, and wherein if a print request for the printing apparatus is confirmed in a condition in which it has been set in said setting step that the bi-directional communication with the printing apparatus is not always accepted, then said communication control step includes shifting the bi-directional communication with the printing apparatus in the rest state to the operative state.

* * * * *